US009105912B2

(12) United States Patent
Zhao (10) Patent No.: US 9,105,912 B2
(45) Date of Patent: Aug. 11, 2015

(54) BOLTLESS BATTERY CELL CONNECTION (71) Applicant: Tyco Electronics Corporation, Berwyn, PA (US)

(72) Inventor: Weiping Zhao, Superior Twp., MI (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 116 days.

(21) Appl. No.: 13/839,931

(22) Filed: Mar. 15, 2013

(65) Prior Publication Data

US 2013/0309537 A1    Nov. 21, 2013

Related U.S. Application Data

(60) Provisional application No. 61/649,820, filed on May 21, 2012.

(51) Int. Cl.
    *H01M 2/20*      (2006.01)
    *H01M 2/26*      (2006.01)
    *H01M 2/30*      (2006.01)

(52) U.S. Cl.
    CPC ............... *H01M 2/206* (2013.01); *H01M 2/26* (2013.01); *H01M 2/266* (2013.01); *H01M 2/305* (2013.01); *H01M 2220/20* (2013.01)

(58) Field of Classification Search
    USPC .................................... 429/99, 100, 158–160
    See application file for complete search history.

(56) References Cited

U.S. PATENT DOCUMENTS

| | | | |
|---|---|---|---|
| 5,626,984 A * | 5/1997 | Albini | 429/178 |
| 6,261,719 B1 * | 7/2001 | Ikeda et al. | 429/211 |
| 2010/0015519 A1 * | 1/2010 | Trester et al. | 429/160 |
| 2010/0190050 A1 * | 7/2010 | Ochi | 429/160 |
| 2010/0247998 A1 | 9/2010 | Hostler et al. | |
| 2011/0097620 A1 * | 4/2011 | Kim | 429/161 |

FOREIGN PATENT DOCUMENTS

| | | | |
|---|---|---|---|
| JP | 2001249303 A | * | 9/2001 |
| JP | 2002151045 A | * | 5/2002 |
| WO | 2010 085636 A2 | | 7/2010 |
| WO | WO 2011122453 A1 | * | 10/2011 |

OTHER PUBLICATIONS

International Search Report, International Application No. PCT/US2013/040731, International Filing Date May 13, 2013.

* cited by examiner

*Primary Examiner* — Gregg Cantelmo (57) ABSTRACT

A battery pack includes a plurality of battery cells each having positive and negative cell terminals and a carrier mounted over and spanning across the plurality of battery cells. The carrier has trays with openings therethrough exposing the positive and negative cell terminals. A plurality of buss bars are received in corresponding trays. The buss bars each have a positive plate laser welded to the positive cell terminal of a corresponding battery cell through the corresponding opening and a negative plate laser welded to the negative cell terminal of a different battery cell through the corresponding opening. The buss bars may be bimetal buss bars.

20 Claims, 11 Drawing Sheets

BOLTLESS BATTERY CELL CONNECTION

CROSS REFERENCE TO RELATED APPLICATIONS

This application claims the benefit of U.S. Provisional Application No. 61/649,820 filed May 21, 2012, titled BOLTLESS BATTERY CELL CONNECTION, the subject matter of which is herein incorporated by reference in its entirety.

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. Different types of battery modules are formed using different types of cells. For example, one type of battery modules are known as pouch type battery modules, another type of battery modules are known as prismatic battery modules, and a third type of battery modules are known as cylindrical battery modules.

Prismatic battery modules use prismatic battery cells that are stacked together. The positive and negative cell terminals are connected using buss bars. The positive and negative cells typically include a threaded post or bolt. The buss bar is connected to the post using a nut. Such connections are time consuming Typical battery modules include ten or more battery cells that are each connected together using the buss bars and nuts.

A need remains for battery modules that may be assembled quickly.

BRIEF DESCRIPTION OF THE INVENTION

In one embodiment, a battery pack is provided that includes a plurality of battery cells each having positive and negative cell terminals and a carrier mounted over and spanning across the plurality of battery cells. The carrier has trays with openings therethrough exposing the positive and negative cell terminals. A plurality of buss bars are received in corresponding trays. The buss bars each have a positive plate laser welded to the positive cell terminal of a corresponding battery cell through the corresponding opening and a negative plate laser welded to the negative cell terminal of a different adjacent battery cell through the corresponding opening. The buss bars may be bimetal buss bars.

Optionally, the trays may have pockets receiving corresponding buss bars and tabs extending into the pockets to secure the buss bars in the pockets. The buss bars may be loaded in the carrier prior to mounting the carrier to the battery cells. The carrier may include flexible hinges between adjacent trays to allow relative movement between the trays and corresponding buss bars held by the trays. The carrier may hold a voltage sensing wire harness having a plurality of voltage sensing wires. The voltage sensing wires may be terminated to corresponding buss bar to sense a voltage of the buss bars. Each buss bar may include a voltage sensing contact extending therefrom that is terminated to voltage sensing wires held by the carrier. The battery pack may include a cover covering the trays and the buss bars.

Optionally, the carrier may include front trays extending forward from a front of the carrier that receive battery terminals coupled to corresponding buss bars. The battery pack may include a positive battery terminal received in the carrier and terminated to a corresponding positive cell terminal and a negative battery terminal received in the carrier and terminated to a corresponding negative cell terminal The positive and negative battery terminals may each have quick connection ends. The battery pack may include a module-to-module terminal connected to the quick connection ends of the positive and negative battery terminals to electrically connect the positive and negative battery terminals. The battery pack may include a positive battery terminal received in the carrier and laser welded to a corresponding positive cell terminal The battery terminal may have a quick connection end for electrical connection to a power terminal In another embodiment, a battery pack is provided including a first battery cell having positive and negative cell terminals with flat pads and a second battery cell having positive and negative cell terminals with flat pads. A bimetal buss bar electrically connects the positive cell terminal of the first battery cell to the negative cell terminal of the second battery cell. The buss bar has a positive plate being terminated to the flat pad of the positive cell terminal of the first battery cell and the buss bar having a negative plate being terminated to the flat pad of the negative cell terminal of the second battery cell. Optionally, the buss bar may be laser welded to the corresponding flat pads. The buss bar may have a voltage sensing contact extending therefrom that is configured to be terminated to a voltage sensing wire for sensing a voltage of the buss bar.

In a further embodiment, a battery pack is provided including a buss bar having a plate and a voltage sensing contact integral with, and extending from, the plate. The buss bar is terminated between corresponding cell terminals of adjacent battery cells. Optionally, the plate is a bimetal plate having an aluminum positive plate and a copper negative plate with the voltage sensing contact extending from the copper negative plate. The voltage sensing contact may include a crimp barrel configured to be crimped to a voltage sensing wire. The voltage sensing contact may include a wire termination pad configured to receive an end of a voltage sensing wire with the voltage sensing wire welded to the voltage sensing contact and the wire termination pad.

DETAILED DESCRIPTION OF THE INVENTION

Figure 1:
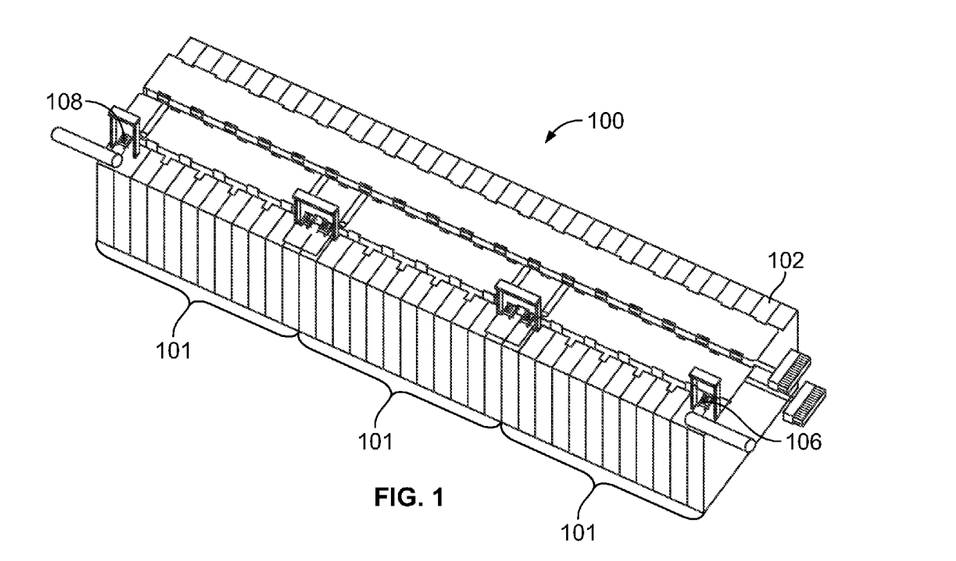
FIG. 1 is a top perspective view of a battery pack formed in accordance with an exemplary embodiment.

FIG. 1 is a top perspective view of a battery pack 100 formed in accordance with an exemplary embodiment. The battery pack 100 includes a plurality of battery modules 101 stacked together. The battery pack 100 may be used as part of a battery system in a vehicle, such as an electric vehicle or a hybrid electrical vehicle. The battery pack 100 may be used in other applications in alternative embodiments.

Each battery module 101 includes a plurality of prismatic battery cells 102. The prismatic battery cells 102 are arranged in a stacked configuration, side-by-side, to form the battery module 101. Optional, the battery module 101 may include a case or other housing that holds the prismatic cells 102. A battery cover may be provided over the tops of the prismatic battery cells 102. The battery cover may cover each of the prismatic battery cells 102.

Each battery module 101 includes a positive battery terminal 106 and a negative battery terminal 108. The battery terminals 106, 108 are configured to be coupled to an external power cable or alternatively may be bussed to battery terminals of another battery module 101. In an exemplary embodiment, the battery terminals 106, 108 are connected using quick-connection types of connectors.

Figure 2:
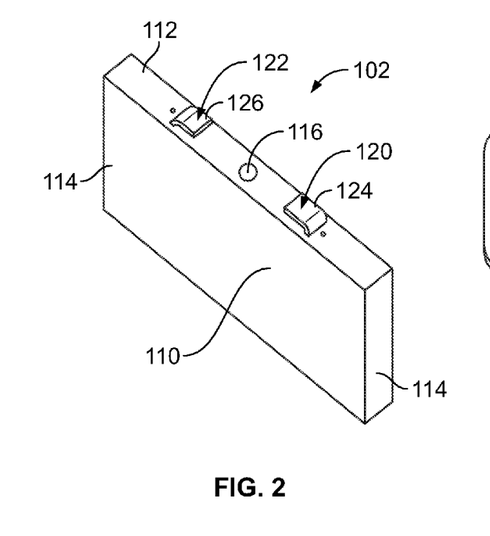
FIG. 2 is a top perspective view of one of the prismatic battery cells formed in accordance with exemplary embodiment.

FIG. 2 is a top perspective view of one of the prismatic battery cells 102 formed in accordance with exemplary embodiment. The prismatic battery cell 102 includes a cell housing 110 having a top 112 and side walls 114. In the illustrated embodiment, the cell housing 110 is boxed shaped having four side walls 114. The battery cell 102 has a gas pressure valve 116 on the top 112.

The battery cell 102 includes a positive cell terminal 120 and a negative cell terminal 122. In an exemplary embodiment, the positive cell terminal 120 is aluminum and the negative cell terminal 122 is copper. The positive cell terminal 120 has a post 124 extending from the top 112 that is used as a connection interface for the battery cell 102. In the illustrated embodiment, the post 124 includes a flat pad having an upper surface that defines the connection interface. The negative cell terminal 122 has a post 126 extending from the top 112 that is used as a connection interface for the battery cell 102. In the illustrated embodiment, the post 126 includes a flat pad having an upper surface that defines the connection interface.

Figure 3:
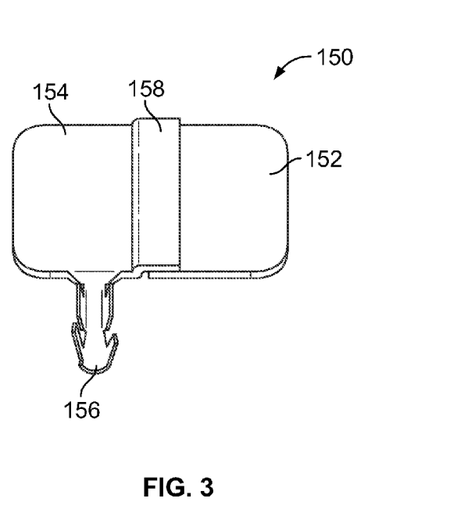
FIG. 3 is a top perspective view of a buss bar formed in accordance with an exemplary embodiment.

FIG. 3 is a top perspective view of a buss bar 150 formed in accordance with an exemplary embodiment. The buss bar 150 is used to electrically connect battery terminals of adjacent prismatic battery cells 102 (shown in FIG. 2). The buss bar 150 provides galvanic protection by reducing or eliminating galvanizing when connecting to both positive and negative cell terminals (e.g. aluminum and copper cell terminals).

The buss bar 150 includes a positive plate 152 and a negative plate 154. The positive plate 152 is configured to be terminated to a corresponding positive cell terminal 120 (shown in FIG. 2) of one battery cell 102 and the negative plate 154 is configured to be terminated to a corresponding negative cell terminal 122 (shown in FIG. 2) of the adjacent battery cell 102. In an exemplary embedment, the positive and negative plates 152, 154 are separately manufactured and coupled together, such as by ultrasonic welding, cladding or other processes. Alternatively, the positive and negative plates 152, 154 may be integrally formed. Optionally, the positive and/or negative plates 152, 154 may be plated. The positive and negative plates 152, 154 may have any thicknesses and shapes. The thicknesses and shapes may be different than each other. Optionally, a high concentration aluminum, such as 64% ICAS aluminum may be used. The size and shape of the positive plate 152 may be selected to have a similar or equivalent resistance as the negative plate 154 across the buss bar 150.

The buss bar 150 includes a voltage sensing contact 156 extending from the negative plate 154. In the illustrated embodiment, the voltage sensing contact 156 constitutes a crimp barrel configured to receive a wire of a voltage sensing system. Crimping provides a reliable connection with the wire for accurate, reliable sensing. Other types of contacts may be provided in alternative embodiments to connect to a corresponding component of the voltage sensing system, such as an insulation displacement contact, a spring contact, a pin, a socket, a poke-in wire connection, a welding pad, and the like. The voltage sensing wire may be affixed to the buss bar 150, such as be welding, soldering, using conductive adhesive, and the like in other alternative embodiments. The location of the voltage sensing contact 156 may vary depending on the particular application. Some embodiments may not include the voltage sensing contact 156. In alternative embodiments, the voltage sensing contact 156 may be a separate component coupled to the negative plate 154, such as by being soldered, welded, fastened or otherwise secured to the negative plate 154. Optionally, the voltage sensing contact 156 may be stamped and formed with the negative plate 154. The voltage sensing contact 156 may be electrically connected to a module controller that monitors the voltage of the cells by measuring the voltage across the buss bar 150. The voltage sensing contact 156 may be formed with and/or extend from the positive plate 152 in alternative embodiments.

Figure 4:
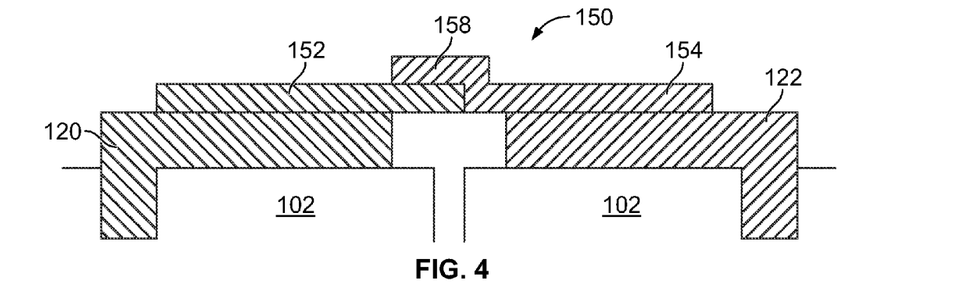
FIG. 4 is a cross sectional view of the buss bar formed in accordance with an exemplary embedment.

FIG. 4 is a cross sectional view of the buss bar 150 formed in accordance with an exemplary embedment. The buss bar 150 is manufactured by ultrasonically welding the positive and negative plates 152, 154. The positive plate 152 is made from an aluminum material. The negative plate 154 is made from a copper material. A bimetal bridge 158 is formed between the positive and negative plates 152, 154. In an exemplary embodiment, a portion of the negative plate 154 spans over at least a portion of the positive plate 152 to form the bridge 158, however the positive plate 152 may span over the negative plate to form the bridge in alternative embodiments. The bridge 158 defines a bimetal interface between the positive plate 152 and the negative plate 154. The bimetal interface has a large surface area for ensuring connection between the positive plate 152 and the negative plate 154. The surface area is defined by the length and the width of overlap of the bridge 158. In an exemplary embodiment, both the length and the width are greater than a thickness of the plates 152, 154. Optionally, approximately 10% or more of the negative plate 154 may overlap the positive plate 152. In an exemplary embodiment, the bimetal interface is generally planar and parallel to the plane of the buss bar 150. Optionally, the positive plate 152 may be an aluminum plate and the negative plate 154 may be a copper plate. The positive plate 152 may be terminated to the negative plate 154, such as by a cladding process, a welding process or another terminating process.

The buss bar 150 is coupled between adjacent battery cells 102 such that positive plate 152 is terminated to the positive cell terminal 120 of one battery cell 102 and the negative plate 154 is terminated to a corresponding negative cell terminal 122 of the adjacent battery cell 102. In an exemplary embodiment, the plates 152, 154 are laser welded to the corresponding terminals 120, 122. Laser welding eliminates the need for a nut and threading of the nut on a threaded post. The buss bar 150 may be terminated more quickly by laser welding. The laser welding provides a good electrical connection between the buss bar 150 and the terminals 120, 122, such as an interface having low interface resistance.

Figure 5:
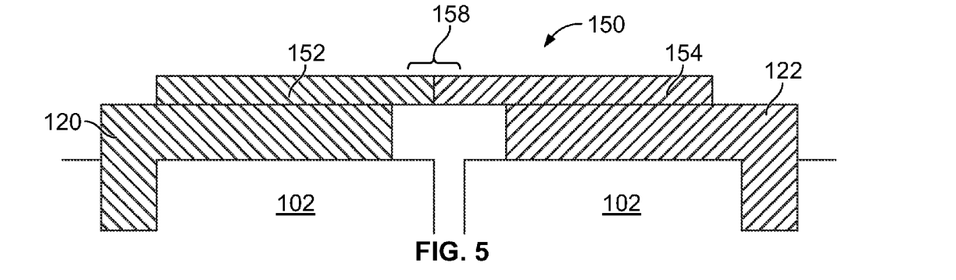
FIG. 5 is a cross sectional view of the buss bar formed in accordance with an exemplary embedment.

FIG. 5 is a cross sectional view of the buss bar 150 formed in accordance with an exemplary embodiment. The buss bar 150 is manufactured by cladding the positive and negative plates 152, 154. The positive plate 152 is made from an aluminum material. The negative plate 154 is made from a copper material. A bimetal bridge 158 is formed between the positive and negative plates 152, 154 at the area of cladding.

The buss bar 150 is coupled between adjacent battery cells 102 such that positive plate 152 is terminated to the positive cell terminal 120 of one battery cell 102 and the negative plate 154 is terminated to a corresponding negative cell terminal 122 of the adjacent battery cell 102. In an exemplary embodiment, the plates 152, 154 are laser welded to the corresponding terminals 120, 122.

Figure 6:
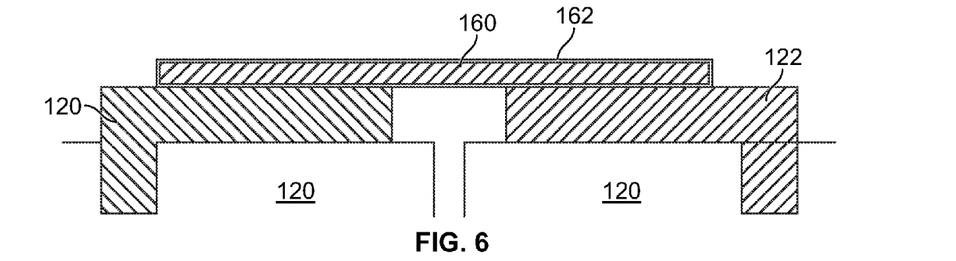
FIG. 6 is a cross sectional view of the buss bar formed in accordance with an exemplary embedment.

FIG. 6 is a cross sectional view of the buss bar 150 formed in accordance with an exemplary embodiment. The buss bar 150 is manufactured from a copper plate 160 that is coated with a coating 162. Optionally, the coating 162 may be a coating capable of being affixed to the plates 152, 154. For example, the coating 162 may be capable of being laser welded. The coating 162 provides galvanic protection against galvanizing.

Figure 7:
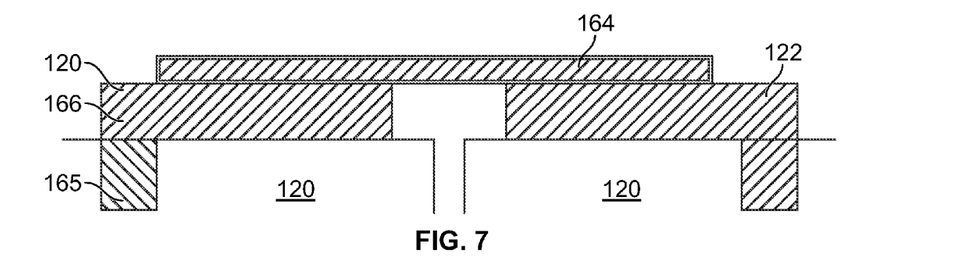
FIG. 7 is a cross sectional view of the buss bar formed in accordance with an exemplary embedment.

The buss bar 150 is coupled between adjacent battery cells 102 such that positive plate 152 is terminated to the positive cell terminal 120 of one battery cell 102 and the negative plate 154 is terminated to a corresponding negative cell terminal 122 of the adjacent battery cell 102. In an exemplary embodiment, the plates 152, 154 are laser welded to the corresponding terminals 120, 122. The coating 162 is a material configured to be coupled to both the aluminum terminal and the copper terminal FIG. 7 is a cross sectional view of the buss bar 150 formed in accordance with an exemplary embodiment. The buss bar 150 is manufactured from a copper plate 164. The positive cell terminal 120 includes an aluminum post 165 and a bimetal post 166 extending from the aluminum post 165. The bimetal post 166 may be an aluminum-copper bimetal.

The buss bar 150 is coupled between adjacent battery cells 102 such that positive plate 152 is terminated to the bimetal post 166 of the positive cell terminal 120 of one battery cell 102 and the negative plate 154 is terminated to a corresponding negative cell terminal 122 of the adjacent battery cell 102. In an exemplary embodiment, the plates 152, 154 are laser welded to the corresponding terminals 120, 122.

Figure 8:
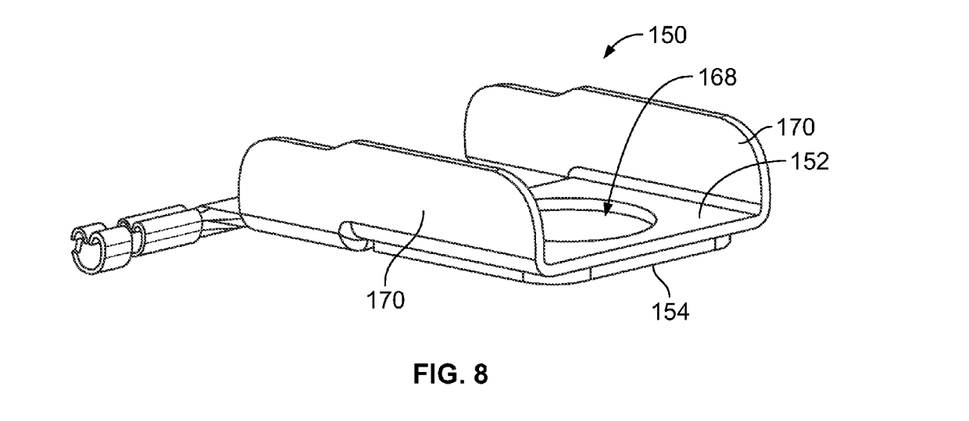
FIG. 8 is a perspective view of the buss bar formed in accordance with an exemplary embodiment.

FIG. 8 is a perspective view of the buss bar 150 formed in accordance with an exemplary embodiment. The buss bar 150 is manufactured by ultrasonically welding the positive plate 152 to the negative plate 154 over an opening 168 through the negative plate 154. The buss bar 150 includes walls 170 to strengthen the buss bar 150. The shape of the negative plate 154 accommodates the positive plate 152. The positive plate 152 is made from an aluminum material. The negative plate 154 is made from a copper material. The positive and negative plates 152, 154 are ultrasonically welded to create a bimetal interface therebetween to provide galvanic protection against galvanizing.

Figure 9:
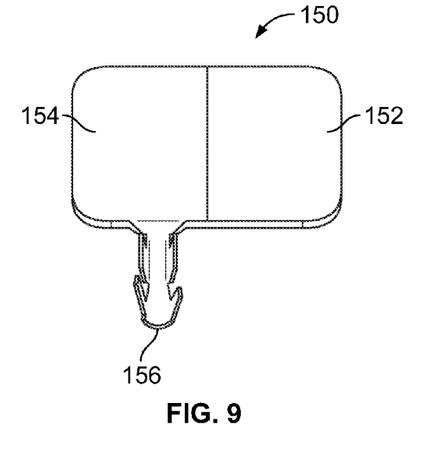
FIG. 9 is a perspective view of the buss bar formed in accordance with an exemplary embedment.

FIG. 9 is a perspective view of the buss bar 150 formed in accordance with an exemplary embodiment. The buss bar 150 is manufactured by cladding the positive and negative plates 152, 154. The positive plate 152 is made from an aluminum material. The negative plate 154 is made from a copper material. The voltage sensing contact 156 extends from the negative plate 154.

Figure 10:
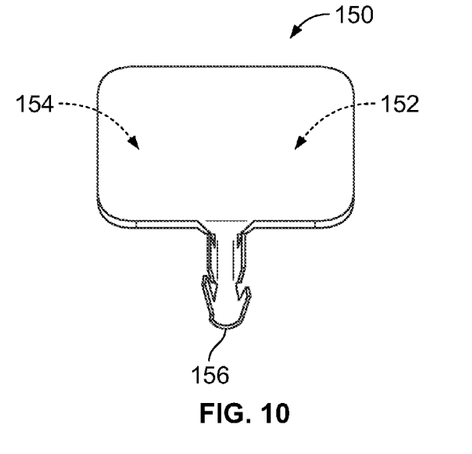
FIG. 10 is a perspective view of the buss bar formed in accordance with an exemplary embodiment.

FIG. 10 is a perspective view of the buss bar 150 formed in accordance with an exemplary embodiment. The buss bar 150 is manufactured from a copper sheet. The buss bar 150 may include a nickel, or other, coating. The positive and negative plates 152, 154 are defined by the opposite ends of the copper sheet. The voltage sensing contact 156 extends from the copper sheet and may be located along an edge, such as centered along an edge.

Figure 11:
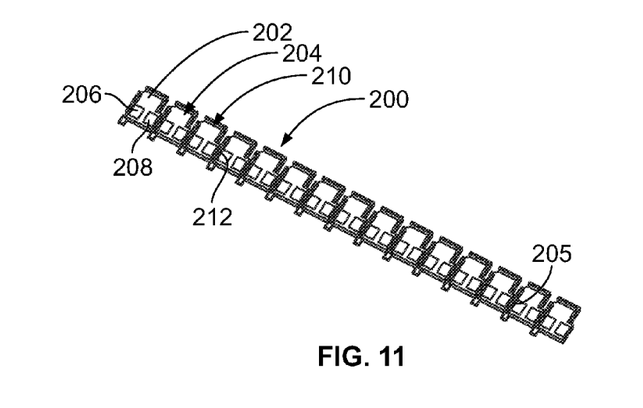
FIG. 11 illustrates a rear carrier for the buss bars.

FIG. 11 illustrates a rear carrier 200 for the buss bars 150. The rear carrier 200 is configured to be mounted to the tops 112 of the battery cells 102 (shown in FIG. 2). The rear carrier 200 includes a plurality of trays 202 that receive corresponding buss bars 150 (shown in FIG. 3). The trays 202 have receptacles or pockets 204 that receive the buss bars 150. The pockets 204 are sized and shaped to receive and retain the buss bars 150. For example, the buss bars 150 may be held in the trays 202 by an interference fit. Projections or tabs 205 may extend into the pockets 204 to engage and retain the buss bars 150.

The trays 202 have openings 206, 208 that expose the positive and negative cell terminals 120, 122, respectively. The buss bars 150 may be laser welded or otherwise terminated to the battery cells 102 through the openings 206, 208. Optionally, portions of the buss bars 150 may extend into the openings 206, 208 to engage the battery cells 102 and/or portions of the battery cells may extend into the openings 206, 208 to engage the buss bars 150.

The trays 202 have voltage sensing wire termination areas 210. Voltage sensing wires are routed from a wire harness into the areas 210 for termination to the voltage sensing contacts 156 (shown in FIG. 3). In an exemplary embodiment, adjacent trays 202 are separated by flexible hinges 212 that allow relative movement of the trays 202 and thus the buss bars 150 for positioning on the battery cells 102. The flexible hinges 212 may be provided between all adjacent trays 202 or between certain ones of the trays 202, such as every fourth trays 202. The rear carrier 200 is manufactured from a dielectric material, such as a plastic material. The rear carrier 200 electrically isolates the buss bars 150 from one another and from the environment surrounding the buss bars 150.

Figure 12:
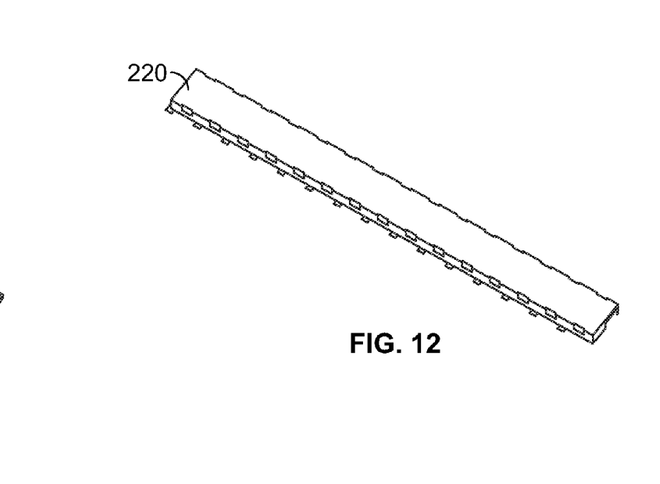
FIG. 12 illustrates a rear cover.

FIG. 12 illustrates a rear cover 220 that is configured to be coupled to the rear carrier 200 (shown in FIG. 11) over the buss bars 150. The rear cover 220 is manufactured from a dielectric material, such as a plastic material. The rear cover 220 protects from inadvertent touching of the buss bars 150. Optionally, the rear cover 220 may be integral with the rear carrier 200, such as being co-molded with the rear carrier 200. Optionally, the rear cover 220 may include flexible hinges that allow relative movement of the sections of the rear cover 220 for positioning on the rear carrier 200.

Figure 13:
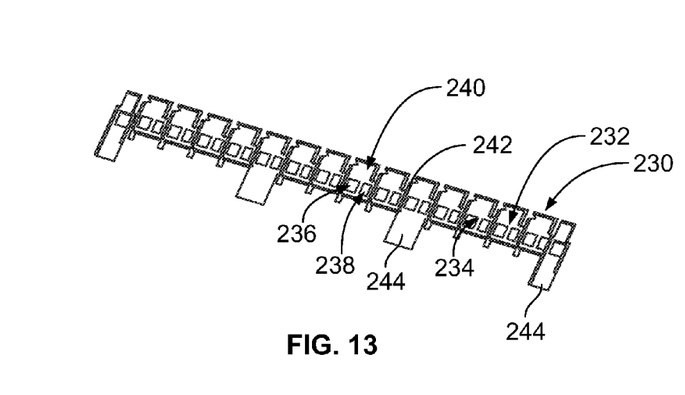
FIG. 13 illustrates a front carrier for the buss bars.

FIG. 13 illustrates a front carrier 230 for the buss bars 150. The front carrier 230 is configured to be mounted to the tops 112 of the battery cells 102 (shown in FIG. 2). The front carrier 230 is manufactured from a dielectric material, such as a plastic material. The front carrier 230 protects from inadvertent touching of the buss bars 150 (shown in FIG. 3).

The front carrier 230 includes a plurality of trays 232 that receive corresponding buss bars 150. The trays 232 have receptacles or pockets 234 that receive the buss bars 150. The pockets 234 are sized and shaped to receive and retain the buss bars 150. For example, the buss bars 150 may be held in the trays 232 by an interference fit. Projections or tabs may extend into the pockets 234 to engage and retain the buss bars 150.

The trays 232 have openings 236, 238 that expose the positive and negative cell terminals 120, 122, respectively. The buss bars 150 may be laser welded or otherwise terminated to the battery cells 102 through the openings 236, 238. Optionally, portions of the buss bars 150 may extend into the openings 236, 238 to engage the battery cells 102 and/or portions of the battery cells 102 may extend into the openings 236, 238 to engage the buss bars 150.

Figure 23:
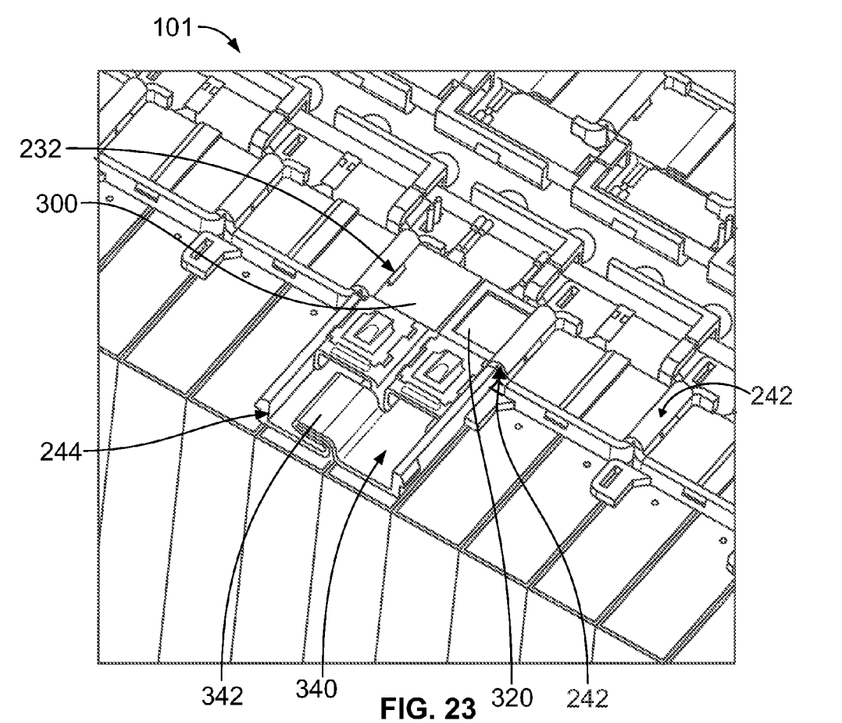
FIG. 23 illustrates another portion of the battery module.

The trays 232 have voltage sensing wire termination areas 240. The voltage sensing wires are routed from a wire harness into the areas 240 for termination to the voltage sensing contacts 156 (shown in FIG. 3). In an exemplary embodiment, the trays 232 are separated by flexible hinges 242 (also shown in FIG. 23) that allow relative movement of the trays 232 and thus the buss bars 150 for positioning on the battery cells 102. In the illustrated embodiment, as shown in FIG. 23, the flexible hinges are U-shaped flexible hinges allowing relative longitudinal movement between the adjacent trays 232, and thus the buss bars 150 held by the trays 232. The flexible hinges 242 may be provided between all adjacent trays 232 or between certain ones of the trays 232, such as every fourth trays 232.

Front trays 244 are provided forward of some of the trays 232. The front trays 244 provide additional space for holding the buss bars 150 and other components. Optionally, battery terminals may be terminated to corresponding buss bars within the front trays 244. Module-to-module battery terminals may be received in the front trays 244. Positive or negative battery terminals may be received in the front trays 244. Power cables may be received in the front trays 244.

Figure 14:
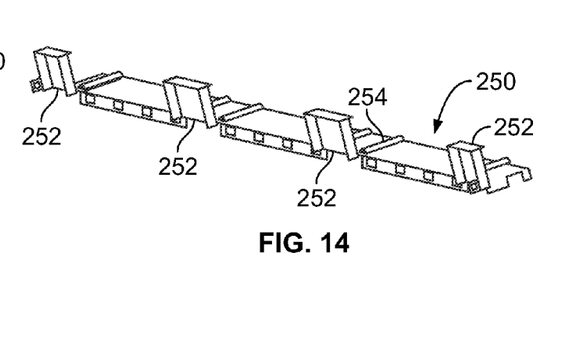
FIG. 14 illustrates a front cover.

FIG. 14 illustrates a front cover 250 that is configured to be coupled to the front carrier 230 (shown in FIG. 13) over the buss bars 150. The front cover 250 is manufactured from a dielectric material, such as a plastic material. The front cover 250 protects from inadvertent touching of the buss bars 150. Optionally, the front cover 250 may be integral with the front carrier 230, such as being co-molded with the front carrier 230.

The front cover 250 includes lids 252. The lids 252 are hingedly coupled to a front edge of the front cover 250. The lids 252 are configured to be aligned with corresponding front trays 244. The lids 252 cover the buss bars 150 and/or other components coupled to the buss bars 150.

In an exemplary embodiment, the front cover 250 includes flexible hinges 254 that allow relative movement of the sections of the front cover 250 for positioning on the front carrier 230.

Figure 15:
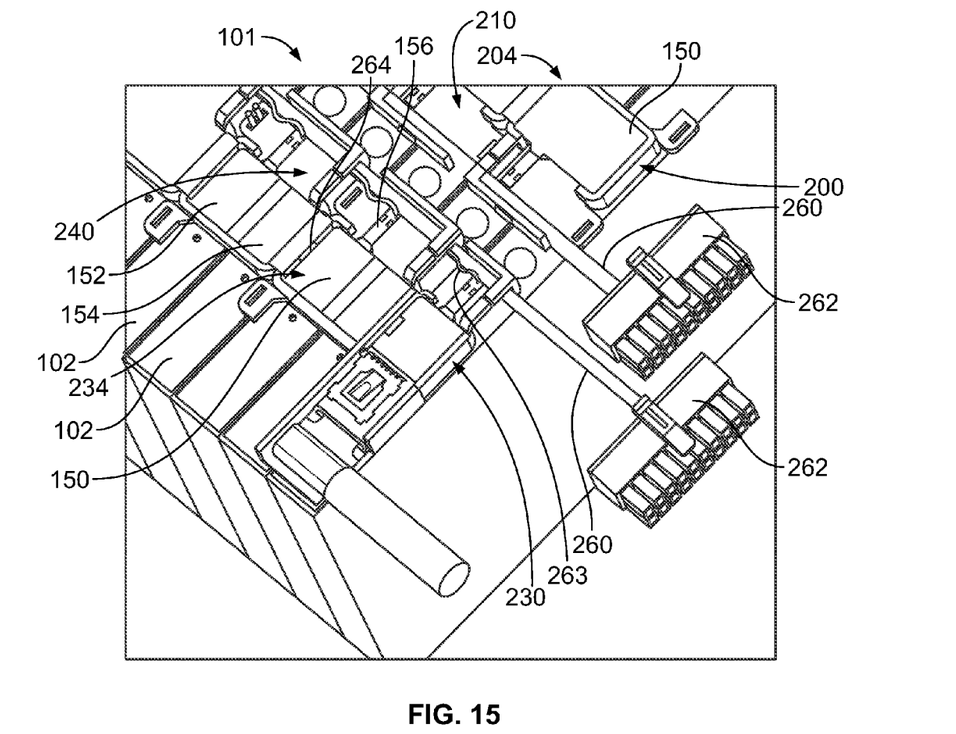
FIG. 15 illustrates a portion of the battery module.

FIG. 15 illustrates a portion of the battery module 101. The rear carrier 200 and the front carrier 230 are illustrated, while the covers 220, 250 (shown in FIGS. 12 and 14) are removed for clarity. Wire harnesses 260 are illustrated with connectors 262 at ends thereof The wire harnesses 260 are electrically connected to corresponding voltage sensing contacts 156 and pass through the voltage sensing wire termination areas 210, 240. For example, individual voltage sensing wires 263 of the wire harness 260 may be connected to corresponding voltage sensing contacts 156.

In the illustrated embodiment, the voltage sensing contacts 156 include crimp barrels for crimping the voltage sensing wires 263 thereto. Alternatively, the voltage sensing contacts 156 may include voltage sensing pads or welding pads where the ends of the voltage sensing wires 263 are welded to the voltage sensing pads to mechanically and electrically connect the voltage sensing wires 263 to the buss bars 150.

The buss bars 150 are positioned in the pockets 204, 234. The positive plate 152 is configured to be aligned with one battery cell 102 and the negative plate 154 is configured to be aligned with an adjacent battery cell 102. Tabs 264 hold the buss bars 150 in position. The voltage sensing contacts 156 extend into the voltage sensing wire termination areas 240. The wires from the wire harness 260 are configured to be routed into the voltage sensing wire termination areas 210, 240 for termination to the contacts 156. In an exemplary embodiment, the carriers 200, 230 include fingers 266 that hold the wire harness 260 in the wire termination areas 210, 240.

The rear carrier 200 and corresponding buss bars 150 are configured to be placed on the battery cells 102 as a unit. The buss bars 150 may then be laser welded, or otherwise mechanically and electrically connected to the battery cells 102. Similarly, the front carrier 230 and corresponding buss bars 150 are configured to be placed on the battery cells 102 as a unit.

Figure 16:
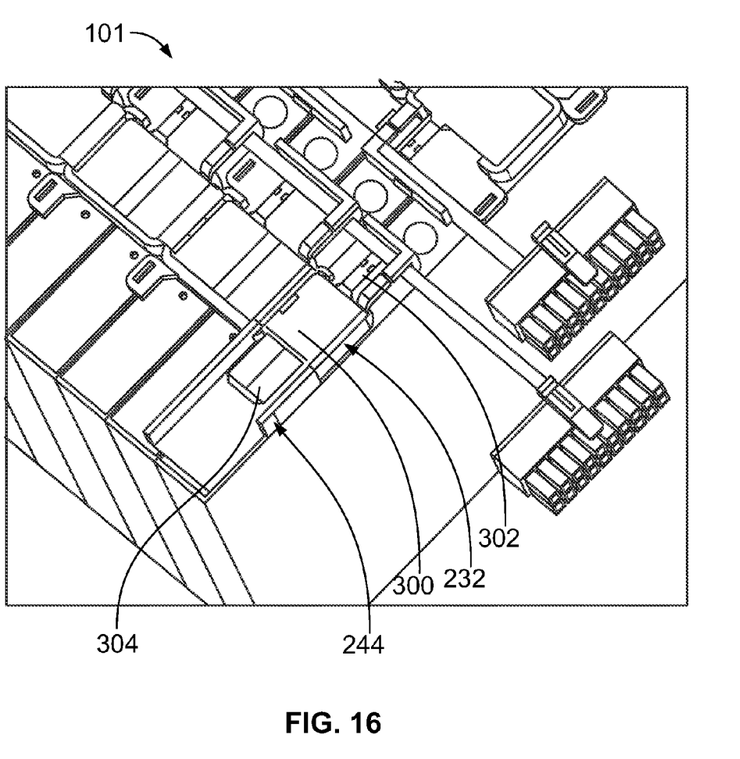
FIG. 16 illustrates another portion of the battery module.
Figure 17:
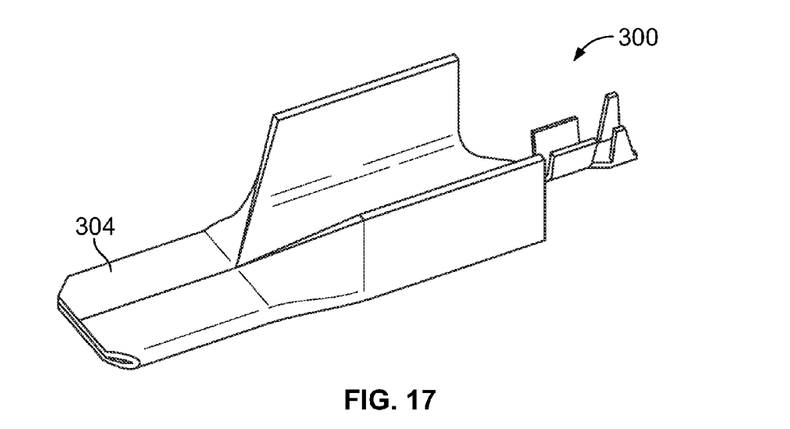
FIG. 17 is a perspective view of the negative battery terminal formed in accordance with an exemplary embodiment.

FIG. 16 illustrates another portion of the battery module 101. A negative battery terminal 300 is illustrated received in a corresponding tray 232 and front tray 244. The negative battery terminal 300 includes a voltage sensing contact 302. The negative battery terminal 300 includes a quick connection end 304 configured to make a quick connection to a corresponding component. In the illustrated embodiment, the quick connection end 304 defines a blade configured to be plugged into a corresponding battery terminal FIG. 17 is a perspective view of the negative battery terminal 300 formed in accordance with an exemplary embodiment showing the quick connection end 304 of the negative battery terminal 300. The negative battery terminal 300 may be stamped and formed. The negative battery terminal 300 is made from a copper material. In the illustrated embodiment, the negative battery terminal 300 has upstanding side walls that provide additional cross sectional area for the terminal 300, such as to carry more current and/or to provide rigidity and support for the quick connection end 304; however the walls may be folded inward, as in the embodiment illustrated in FIG. 16, to lower the profile of the negative battery terminals 300 for some applications. The negative battery terminal 300 may have other shapes in alternative embodiments. The negative batter terminal 300 may have other types of terminating ends in alternative embodiments other than a blade.

Figure 18:
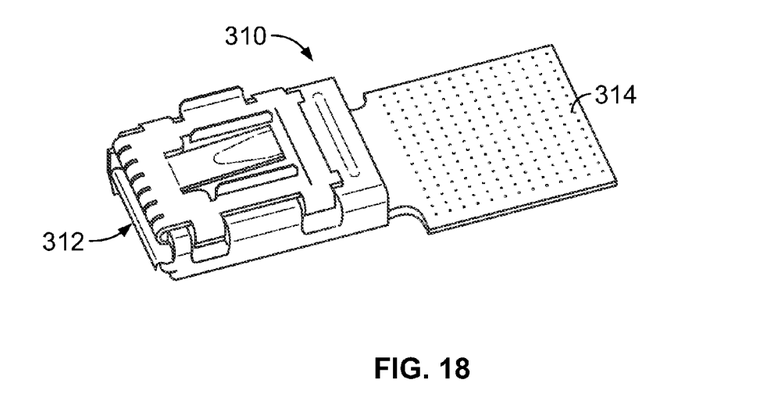
FIG. 18 illustrates a female connector.

FIG. 18 illustrates a power connector 310 configured to be mated with the negative battery terminal 300 (shown in FIG. 17). The power connector 310 has the form of a female or receptacle connector and may be referred to hereinafter as a female connector 310 or a receptacle connector 310. The female connector 310 includes a receptacle 312 that receives the quick connection end 304 (shown in FIG. 16) of the negative battery terminal 300. Optionally, deflectable fingers or other structures may be provided at the receptacle 312 for making an electrical connection with the negative battery terminal 300. The female connector 310 may be stamped and formed. The female connector 310 may be a single piece structure or a multi-piece structure.

The female connector 310 includes a pad 314 at an opposite end. The pad 314 is configured to be connected to a power cable. For example, the power cable may be ultrasonically welded to the pad 314. The female connector 310 may include other features or structures for terminating to the power cable.

Figure 19:
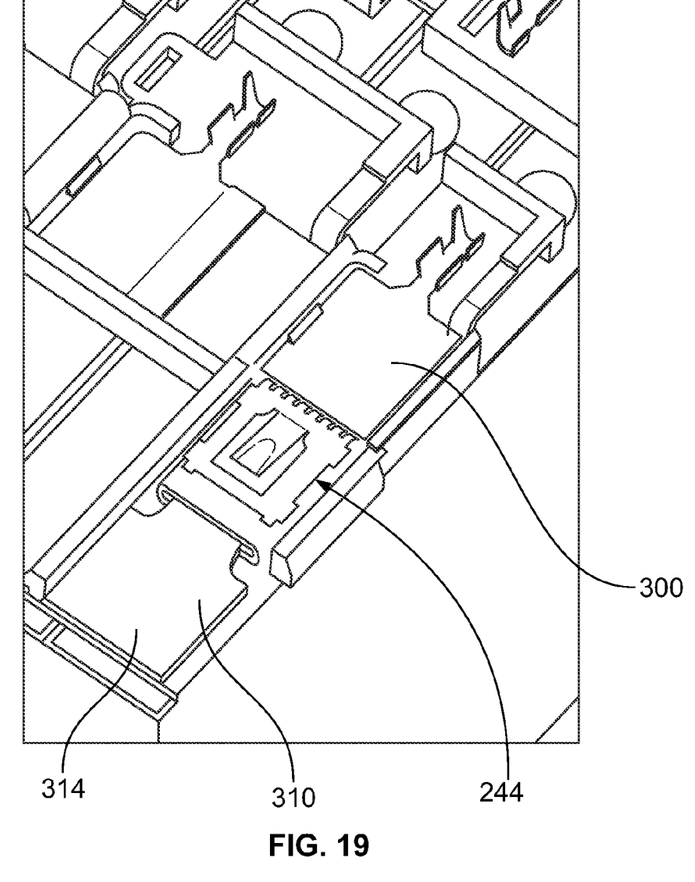
FIG. 19 illustrates the female connector mated to the negative battery terminal

FIG. 19 illustrates the female connector 310 mated to the negative battery terminal 300. The female connector 310 is located in the front tray 244. The pad 314 is exposed for termination of the power cable. Optionally, the front tray 244 may be open in more than one direction to allow the power cable to be positioned at multiple angles with respect to the pad 314. For example, the power cable may be coupled to the pad 314 in line with the female connector 310 and the negative battery terminal 300. Alternatively, the power cable may extend perpendicular or at another angle to the female connector 310 and the negative battery terminal 300 in alternative embodiments.

Figure 20:
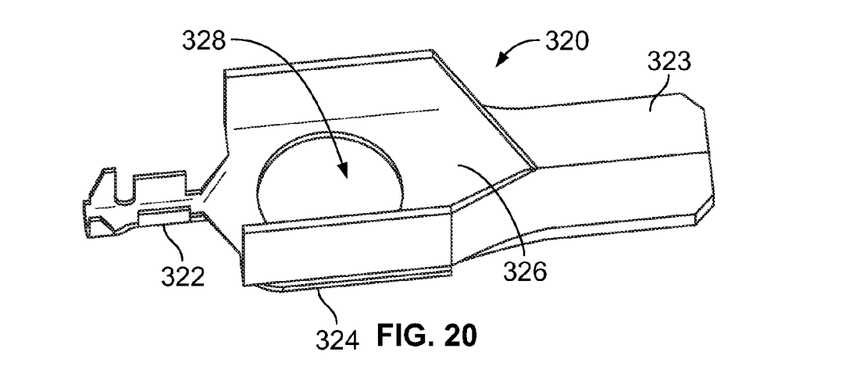
FIG. 20 illustrates a positive battery terminal

FIG. 20 illustrates a positive battery terminal 320. The positive battery terminal 320 includes a voltage sensing contact 322. The positive battery terminal 320 includes a termination end, which in the illustrated embodiment is a quick connection end 323 configured to make a quick connection to a corresponding component. The termination end may have other types of features for making other types of connections in alternative embodiments.

The positive battery terminal 320 includes an aluminum sheet 324 configured to be laser welded to a corresponding positive cell terminal 122 of the battery cell 102 (both shown in FIG. 2). The aluminum sheet 324 may be ultrasonically welded or otherwise mechanically and electrically connected to a main body 326 of the positive battery terminal 320. The main body 326 may be stamped and formed from a copper sheet. The terminal thus defines a bimetal terminal An opening 328 may be provided in the main body 326 to expose the aluminum sheet 324.

Figure 21:
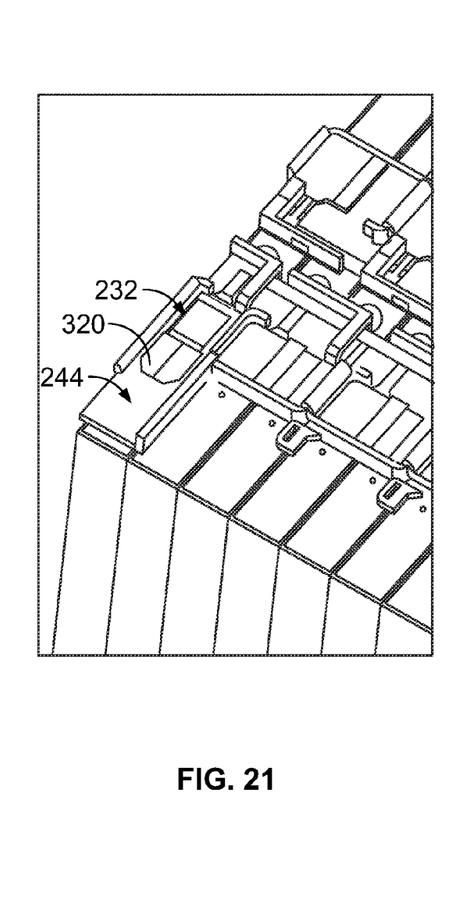
FIG. 21 illustrates the positive battery terminal
Figure 22:
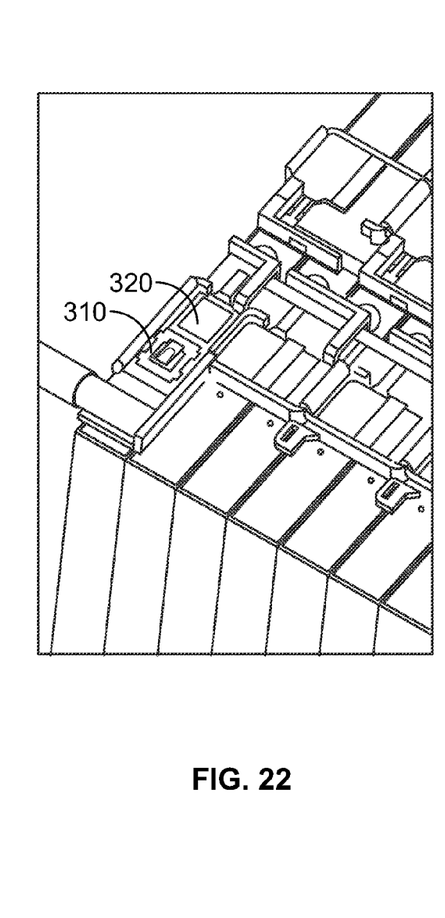
FIG. 22 illustrates a female connector mated to the positive battery terminal

FIG. 21 illustrates the positive battery terminal 320 loaded into the corresponding tray 232 and front tray 244. FIG. 22 illustrates a power connector 310 in the form of a female connector 310 mated to the positive battery terminal 320. A power cable is terminated in any angle to the pad of the female connector 310.

Figure 24:
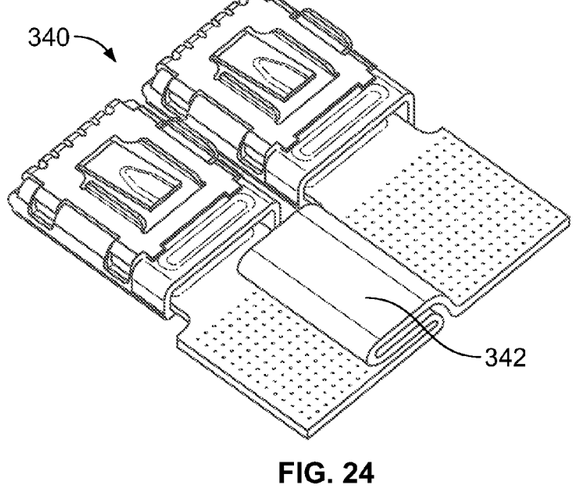
FIG. 24 is a perspective view of the module-to-module female connector.

FIG. 23 illustrates another portion of the battery pack 100 showing two battery modules 101 being connected together using a module-to-module power connector 340. FIG. 24 is a perspective view of the module-to-module power connector 340.

Positive and negative battery terminals 320, 300 are loaded into the corresponding tray 232 and front tray 244 at the appropriate position along the front carrier 230. The power connector 340 is in the form of a module-to-module female connector 340 mated to the terminals 320, 300.

The module-to-module female connector 340 includes two female connectors, similar to the female connectors 310, which are joined by a bridge 342. The bridge 342 may be a flexible bridge to allow relative movement between the terminals 320, 300. The bridge 342 has a low profile. The bridge 342 may be formed from the carrier from the progression die used to manufacture the female terminals 310, where the carrier from the progression die is not removed between two female connectors 310, thus defining the bridge 342. The bridge 342 accommodates vibration energy and relative movement between the female connectors 310.

Figure 25:
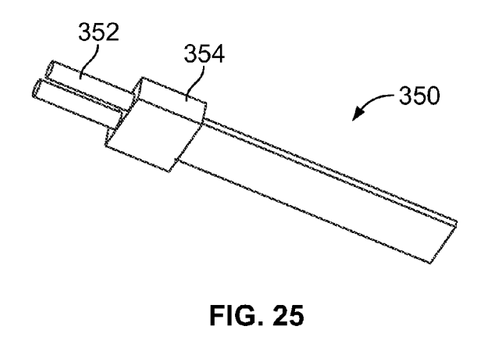
FIG. 25 is a perspective view of a thermistor formed in accordance with an exemplary embodiment.
Figure 26:
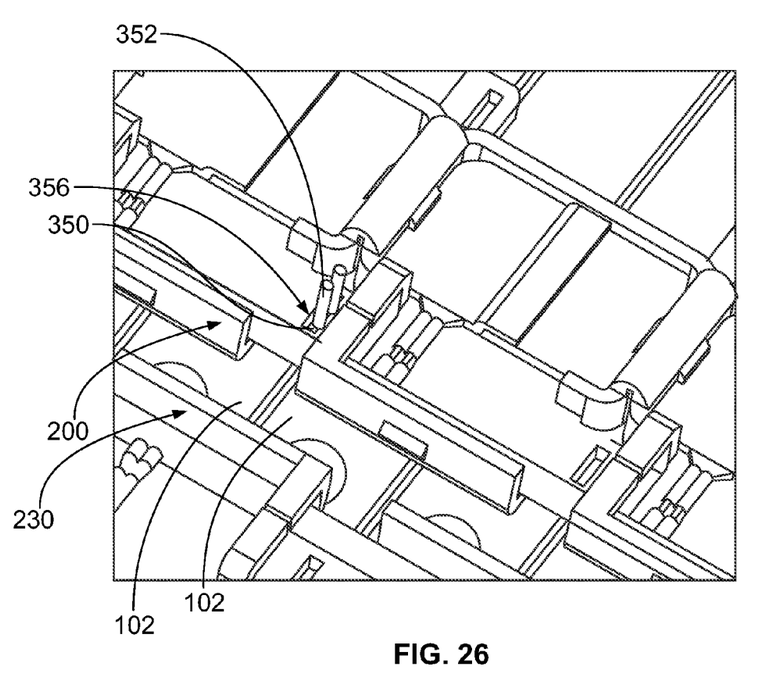
FIG. 26 illustrates the thermistor loaded between adjacent battery cells.

FIG. 25 is a perspective view of a thermistor 350 formed in accordance with an exemplary embodiment. FIG. 26 illustrates the thermistor 350 loaded between adjacent battery cells 102. The thermistor 350 includes wires 352 extending from a base 354. The base 354 is received in a corresponding opening 356 in the carrier 200 or 230. The thermistor 350 may be positioned between any two of the battery cells 102. The carriers 200, 230 provide for flexible positioning of the thermistor 350 by allowing many locations for the thermistor 350. Optionally, multiple thermistors 350 may be used between different battery cells 102 for sensing temperature in different locations of the battery module 101. The opening 356 properly aligns the thermistor at the interface between the battery cells 102. The wires 352 may be routed away from the carrier 200 or 230 through the same area that the voltage sensing wires are routed.

Figure 27:
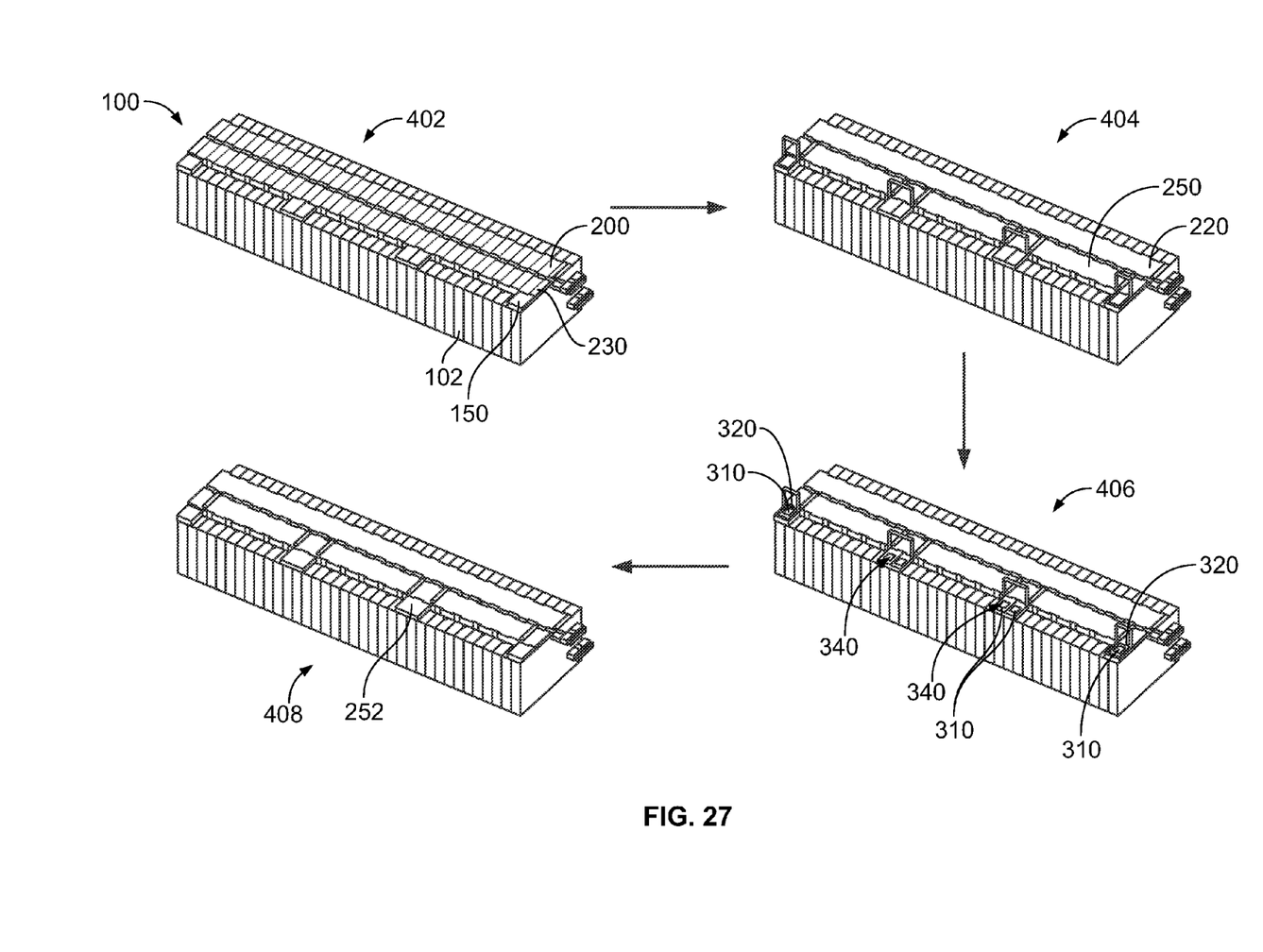
FIG. 27 shows an exemplary assembly method of the battery pack.

FIG. 27 shows an exemplary assembly method of the battery pack 100. At 400, the carriers 200, 230, with the corresponding buss bars 150 and wire harnesses for the voltage sensing system and the temperature sensing system are loaded onto the battery cells 102. The buss bars 150 are mechanically and electrically connected to corresponding cell terminals 120, 122, such as by laser welding.

At 402, the covers 220, 250 are coupled to the carriers 200, 230, respectively. At 404, the female connectors 310 and the module-to-module female connectors 340 are coupled to the corresponding positive and negative battery terminals 320, 300. The power cables are terminated to the female connectors 310, such as by ultrasonically welding. At 406, the lids 252 are closed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A battery pack comprising:
   a plurality of battery cells each having positive and negative cell terminals;
   a carrier being mounted over and spanning longitudinally across the plurality of battery cells, the carrier having trays with openings therethrough exposing the positive and negative cell terminals; and a plurality of buss bars received in corresponding trays, the buss bars each having a positive plate laser welded to the positive cell terminal of a corresponding battery cell through the corresponding opening and a negative plate laser welded to the negative cell terminal of a different battery cell through the corresponding opening;

wherein the carrier comprises U-shaped flexible hinges between adjacent trays, the U-shaped flexible hinges allowing relative longitudinal movement between the trays and corresponding buss bars held by the trays.

2. The battery pack of claim 1, wherein the trays have pockets receiving corresponding buss bars, the trays having tabs extending into the pockets to secure the buss bars in the pockets.

3. The battery pack of claim 1, wherein the buss bars are loaded in the carrier prior to mounting the carrier to the battery cells.

4. The battery pack of claim 1, wherein the buss bars are bimetal buss bars.

5. The battery pack of claim 1, wherein the flexible hinges allow spreading apart of the trays and corresponding buss bars held by the trays.

6. The battery pack of claim 1, wherein the carrier holds a voltage sensing wire harness having a plurality of voltage sensing wires, the voltage sensing wires being terminated to corresponding buss bar to sense a voltage of the buss bars.

7. The battery pack of claim 1, wherein each buss bar comprises a voltage sensing contact extending therefrom, the voltage sensing contact being terminated to voltage sensing wires held by the carrier.

8. The battery pack of claim 1, further comprising a positive battery terminal received in the carrier and terminated to a corresponding positive cell terminal and a negative battery terminal received in the carrier and terminated to a corresponding negative cell terminal, the positive and negative battery terminals each having quick connection ends, the battery pack further comprising a module to module terminal connected to the quick connection ends of the positive and negative battery terminals to electrically connect the positive and negative battery terminals.

9. The battery pack of claim 1, further comprising a positive battery terminal received in the carrier and laser welded to a corresponding positive cell terminal, the battery terminal having a quick connection end for electrical connection to a power terminal.

10. The battery pack of claim 1, further comprising a cover covering the trays and the buss bars.

11. The battery pack of claim 1, wherein the positive plate is configured to be terminated to a flat pad of the positive cell terminal and the negative plate is configured to be terminated to a flat pad of the negative cell terminal.

12. The battery pack of claim 4, wherein at least one of the positive plate and the negative plate includes a bridge spanning over at least a portion of the other of the positive plate and the negative plate, the bridge defining a bimetal interface between the positive plate and the negative plate.

13. The battery pack of claim 7, wherein the buss bar is a bimetal plate having an aluminum positive plate and a copper negative plate, the voltage sensing contact extending from the copper negative plate.

14. The battery pack of claim 7, wherein the voltage sensing contact comprises a crimp barrel configured to be crimped to the corresponding voltage sensing wire.

15. The battery pack of claim 7, wherein the voltage sensing contact comprises a wire termination pad configured to receive an end of the corresponding voltage sensing wire, the corresponding voltage sensing wire being welded to the voltage sensing contact and the wire termination pad.

16. A battery pack comprising:
a plurality of battery cells each having positive and negative cell terminals;
a carrier being mounted over and spanning longitudinally across the plurality of battery cells, the carrier having trays with openings therethrough exposing the positive and negative cell terminals; and
a plurality of buss bars received in corresponding trays, the buss bars each having a positive plate laser welded to the positive cell terminal of a corresponding battery cell through the corresponding opening and a negative plate laser welded to the negative cell terminal of a different battery cell through the corresponding opening;
wherein the carrier comprises front trays extending forward from a front of the carrier, the front trays receiving battery terminals coupled to corresponding buss bars.

17. The battery pack of claim 16, wherein the trays have pockets receiving corresponding buss bars, the trays having tabs extending into the pockets to secure the buss bars in the pockets.

18. The battery pack of claim 16, wherein the buss bars are bimetal buss bars.

19. The battery pack of claim 16, wherein the carrier comprises flexible hinges between adjacent trays, the hinges allowing relative movement between the trays and corresponding buss bars held by the trays.

20. The battery pack of claim 16, wherein each buss bar comprises a voltage sensing contact extending therefrom, the voltage sensing contact being terminated to voltage sensing wires held by the carrier.

* * * * *